United States Patent
Chang

(10) Patent No.: US 11,308,010 B2
(45) Date of Patent: Apr. 19, 2022

(54) MEMORY SYSTEM HAVING MEMORIES OF DIFFERENT CAPACITIES

(71) Applicant: Realtek Semiconductor Corp., HsinChu (TW)

(72) Inventor: Ya-Min Chang, Kaohsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 104 days.

(21) Appl. No.: 16/856,049

(22) Filed: Apr. 23, 2020

(65) Prior Publication Data
US 2020/0364165 A1    Nov. 19, 2020

(30) Foreign Application Priority Data
May 15, 2019 (TW) ................................. 108116685

(51) Int. Cl.
*G06F 13/16* (2006.01)
*G06F 12/1045* (2016.01)

(52) U.S. Cl.
CPC ...... *G06F 13/1694* (2013.01); *G06F 12/1054* (2013.01); *G06F 12/1063* (2013.01); *G06F 13/1678* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 2005/0289317 A1* | 12/2005 | Liou ................... | G06F 13/1684 711/170 |
| 2009/0307418 A1* | 12/2009 | Chen ................... | G06F 11/1048 711/105 |
| 2011/0047346 A1* | 2/2011 | Cypher ............... | G06F 12/0607 711/202 |
| 2012/0311250 A1* | 12/2012 | Chuang ............... | G06F 12/0623 711/105 |
| 2015/0100746 A1 | 4/2015 | Rychlik | |
| 2018/0137909 A1 | 5/2018 | Shaeffer | |

OTHER PUBLICATIONS

Greenberg, "Optimizing LPDDR4 Performance and Power with Multi-Channel Architectures", white paper by Synopsys, Jan. 2016.

* cited by examiner

*Primary Examiner* — Yaima Rigol
(74) *Attorney, Agent, or Firm* — Winston Hsu

(57) ABSTRACT

A memory system includes a memory controller, a first memory, and a second memory. The memory controller has a command address port, a chip select port, a first data port, and a second data port. The first memory is coupled to the command address port, the chip select port, and the first data port, and the second memory is coupled to the command address port, the chip select port, and the second data port. The capacity of the second memory is greater than the capacity of the first memory. The memory controller controls the first memory and the second memory simultaneously through the command address port and the chip select port.

18 Claims, 3 Drawing Sheets

MEMORY SYSTEM HAVING MEMORIES OF DIFFERENT CAPACITIES

BACKGROUND OF THE INVENTION

1. Field of the Invention

The present invention is related to a memory system, and more particularly, to a memory system having memories of different capacities.

2. Description of the Prior Art

In order to increase the data bandwidth for accessing the memory, the memory controller in prior art can divide the input data into two parts and store these two parts of data to two memories of the same capacity using the same address. Consequently, the memory controller can simultaneously write more bits of data, or can read more bits of data at a time, thereby increasing the data bandwidth. However, since the two memories must operate synchronously to store the data using the same address, these two memories must have the same capacity, making the memory configuration inflexible.

In general, to save cost and simplify hardware design, the capacities of commercially available memories are fixed, such as 1 GB or 2 GB. That is, if the user needs only 3 GB of memory, then to increase the data bandwidth with two memories of the same capacities aforementioned, the user would require two memories each of 2 GB to satisfy the needs. Therefore, the hardware cost is unnecessarily increased, and the required area for hardware is also increased.

SUMMARY OF THE INVENTION

One embodiment of the present invention discloses a memory system. The memory system includes a memory controller, a first memory, and a second memory.

The memory controller has a command address port, a chip select port, a first data port, and a second data port. The first memory is coupled to the command address port, the chip select port, and the first data port, and the second memory is coupled to the command address port, the chip select port, and the second data port.

The capacity of the second memory is greater than the capacity of the first memory. The memory controller controls the first memory and the second memory simultaneously through the command address port and the chip select port.

Another embodiment of the present invention discloses a method for operating a memory system. The memory system includes a first memory and a second memory. The capacity of the second memory is greater than the capacity of the first memory. The second memory includes a first physical memory segment and a second physical memory segment. The first physical memory segment of the second memory and the first memory are corresponding to a first virtual memory segment, and the second physical memory segment of the second memory is corresponding to a second virtual memory segment.

The method includes performing a reading operation to the first memory and the second memory according to a corresponding address, the first memory outputting first reading data, the second memory outputting second reading data, and outputting output data according to whether the corresponding address is corresponding to the first virtual memory segment or the second virtual memory segment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
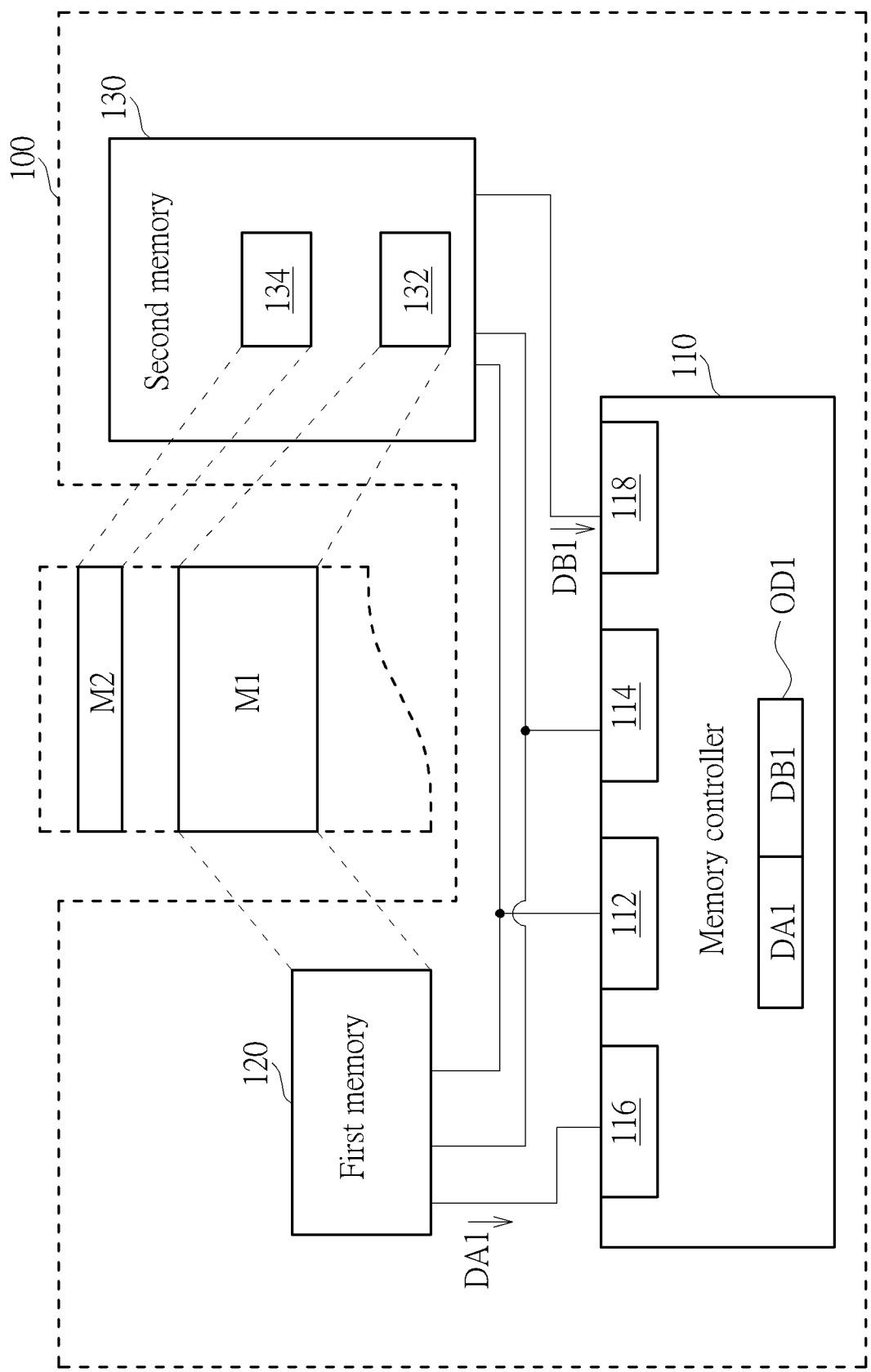
FIG. 1 shows a memory system according to one embodiment of the present invention.

FIG. 1 shows a memory system 100 according to one embodiment of the present invention. The memory system 100 includes a memory controller 110, a first memory 120, and a second memory 130. The memory system 100 can control the first memory 120 and the second memory 130 to perform reading operations and writing operations through the memory controller 110. In some embodiments, the first memory 120 and the second memory 130 can be synchronous dynamic random-access memory (SDRAM), and the memory controller 110 can be the memory controller for controlling the synchronous dynamic random-access memory. Since the first memory 120 and the second memory 130 may need to be activated with some specific waveforms and may have to receive and output data on some specific timings, the central controller in the computer system may access the data stored in the memory through the memory system 100 so as to reduce the burden of the central controller.

The memory controller 110 has a command address port 112, a chip select port 114, a first data port 116, and a second data port 118. The first memory 120 can be coupled to the command address port 112, the chip select port 114, and the first data port 116. The second memory 130 can be coupled to the command address port 112, the chip select port 114, and the second data port 118, and the capacity of the second memory 130 can be greater than the capacity of the first memory 120. Since the first memory 120 and the second memory 130 can be coupled to the same command address port 112 and the same chip select port 114, the memory controller 110 can output the commands and the address through the command address port 112 and select the first memory 120 and the second memory 130 through the chip select port 114 so as to operate the first memory 120 and the second memory 130 synchronously.

In some embodiments, the second memory 130 can include a first physical memory segment 132 and a second physical memory segment 134. Also, the first physical memory segment 132 and the first memory 120 can correspond to a first virtual memory segment M1 together, and the second physical memory segment 134 of the second memory 130 can correspond to a second virtual memory segment M2. For example, each piece of data in the first virtual memory segment M1 can be divided into two parts stored with the same address in the first physical memory segment 132 of the second memory 130 and the first memory 120. Also, the data in the second virtual memory segment M2 can be stored in the second physical memory segment 134 of the second memory 130.

In FIG. 1, when the memory system 100 needs to read the data in the first virtual memory segment M1, the memory controller 110 can generate the corresponding address, and perform the reading operation to the first memory 120 and the second memory 130 with the same corresponding address. Later, the memory controller 110 can combine the first reading data DA1 received from the first memory 120 through the first data port 116 and the second reading data DB1 received from the second memory 130 through the second data port 118 to generate the output data OD1, and output the output data OD1 to a host.

In addition, in some embodiments, when the memory system 100 needs to read the data in the first virtual memory segment M1, since the reading time required for memories of different capacities may be different, the memory controller 110 will wait for the first memory 120 and the second memory 130 until both of them have completed transmitting the reading data, the memory controller 110 will, then, combine the reading data DA1, DB1 and output the output data OD1.

Figure 2:
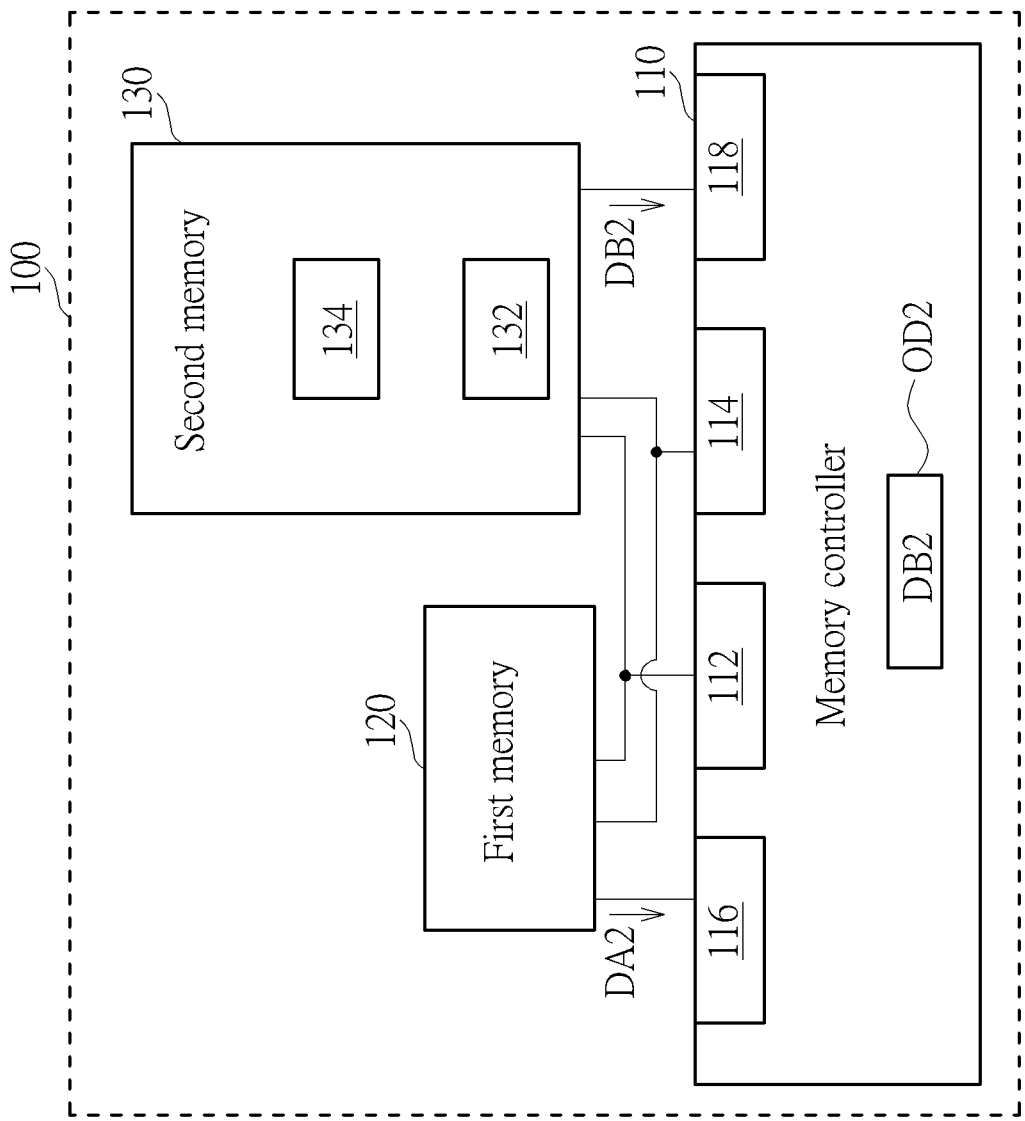
FIG. 2 shows another operation scenario of the memory system in FIG. 1.

FIG. 2 shows another operation scenario of the memory system 100. In FIG. 2, when the memory system 100 needs to read the data in the second virtual memory segment M2, the memory controller 110 can still generate the corresponding address and perform the reading operation to the first memory 120 and the second memory 130 with the same corresponding address. However, since the data in the second virtual memory segment M2 is only stored in the second memory 130, the memory controller 110 may ignore or not receive the reading data DA2 transmitted from the first memory 120 and only receive the reading data DB2 from the second memory 130. Also, the memory controller 110 can take the reading data DB2 received from the second memory 130 through the second data port 118 as the output data OD2, and output the output data OD2 to the host.

When the memory system 100 reads the data in the first virtual memory segment M1, the memory system 100 can output the reading data received from the memories 120 and 130 at the same time. However, when the memory system 100 reads the data in the second virtual memory segment M2, the memory system 100 may only output the reading data received from the second memory 130. Therefore, the effective bandwidth for reading the first virtual memory segment M1 will be greater than the effective bandwidth for reading the second virtual memory segment M2. For example, in FIG. 1, the first memory 120 and the second memory 130 can have the same data bandwidth (DQ bits), for example, but not limited to 16 bits. That is, the reading data DA1 and DB1 can each include 16 bits of data. In this case, since the output data OD1 can include the reading data DA1 and DB1 received from the first memory 120 and the second memory 130, the effective bandwidth of the memory system 100 for outputting the output data OD1 can be 32 bits. In contrast, since the output data OD2 only includes the reading data DB2 received from the second memory 130, the effective bandwidth of the memory system 100 for outputting the output data OD2 would be 16 bits. That is, the memory system 100 can use a greater effective bandwidth when outputting the data corresponding to the first virtual memory segment M1.

Consequently, the memory system 100 can access all the storage space of the memories 120 and 130 having different capacities, and output data with a greater effective bandwidth within a certain storage capacity range, so that the product designer can select the memories of different capacities flexibly according to the total required storage capacity. In addition, since the memory system 100 can operate two memories with one memory controller 110, no extra hardware would be needed.

In some embodiments, since the capacity of the second memory 130 is greater than the capacity of the first memory 120, the memory controller 110 can determine whether the data is corresponding to the first virtual memory segment M1 or the second virtual memory segment M2 according to the corresponding address. That is, when the corresponding address exceeds the capacity of the first memory 120, it may imply that the data requested by the memory system 100 is corresponding to the second virtual memory segment M2.

For example, the capacity of the second memory 130 can be two times the capacity of the first memory 120, the first physical memory segment 132 of the second memory 130 can have the same capacity as the first memory 120, and the first physical memory segment 132 and the second physical memory segment 134 of the second memory 130 can have the same capacity. In this case, the memory controller 110 can determine the corresponding address to be corresponding to the first virtual memory segment M1 or the second virtual memory segment M2 according to the most significant bit of the corresponding address so as to simplify the control logic of the memory controller 110.

Figure 3:
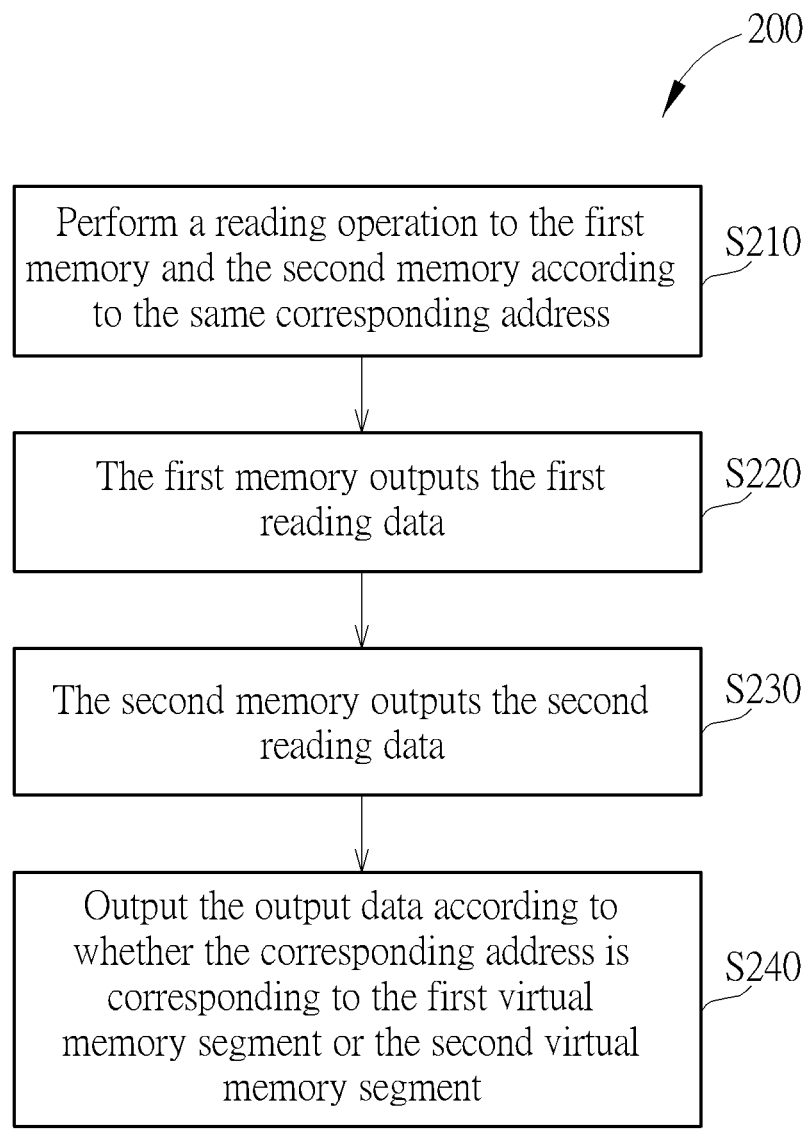
FIG. 3 shows a method for operating the memory system in FIG. 1 according to one embodiment of the present invention.

FIG. 3 shows a method 200 for operating the memory system 100 according to one embodiment of the present invention. The method 200 includes step S210 to S240.

S210: perform a reading operation to the first memory 120 and the second memory 130 according to the same corresponding address;

S220: the first memory 120 outputs the first reading data;

S230: the second memory 130 outputs the second reading data;

S240: output the output data according to whether the corresponding address is corresponding to the first virtual memory segment M1 or the second virtual memory segment M2.

In some embodiments, the memory system 100 can determine the corresponding address to be corresponding to the first virtual memory segment M1 or the second virtual memory segment M2 according to the most significant bit of the corresponding address so as to simplify the control logic of the memory controller 110, and output the corresponding output data in step S240. For example, when the corresponding address is corresponding to the first virtual memory segment M1 as shown in FIG. 1, the memory controller 100 will combine the reading data DA1 and DB1 as the output data OD1. Otherwise, when the corresponding address is corresponding to the second virtual memory segment M2 as shown in FIG. 2, the memory controller 100 may not control the first memory 120 and output the reading data DA2 received from the second memory 130 as the output data OD2.

With the method 200, the memory system 100 can access all the storage space in the memories 120 and 130 of different capacities, and output the data with a greater effective bandwidth within a certain storage capacity range, so that the product designer can select the memories of different capacities flexibly according to the total required storage capacity.

In summary, the memory system and the method for operating the memory system provided by the embodiments of the present invention can use one memory controller to access all the storage space in two memories of different capacities so that the product designer can flexibly select memories of different capacities according to the actual storage capacity required without adding extra hardware elements. In addition, within a certain storage capacity range, the two memories of the memory system can both correspond to the same virtual memory segment so that the memory system can access more bits of data so as to increase the effective bandwidth for data transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory system comprising:
   a memory controller having a command address port, a chip select port, a first data port, and a second data port;
   a first memory coupled to the command address port, the chip select port, and the first data port; and
   a second memory coupled to the command address port, the chip select port, and the second data port;
   wherein:
   a capacity of the second memory is greater than a capacity of the first memory;
   the memory controller controls the first memory and the second memory simultaneously through the command address port and the chip select port;
   the second memory comprises a first physical memory segment and a second physical memory segment;
   the first physical memory segment of the second memory and the first memory are corresponding to a first virtual memory segment; and
   the second physical memory segment of the second memory is corresponding to a second virtual memory segment.

2. The memory system of claim 1, wherein the first memory and the second memory are synchronous dynamic random-access memories (SDRAM).

3. The memory system of claim 1, wherein:
   the memory system outputs output data corresponding to the first virtual memory segment with a first effective bandwidth, and outputs output data corresponding to the second virtual memory segment with a second effective bandwidth; and
   the first effective bandwidth is greater than the second effective bandwidth.

4. The memory system of claim 1, wherein the first physical memory segment of the second memory has a same capacity as the first memory.

5. The memory system of claim 1, wherein the first physical memory segment of the second memory has a same capacity as the second physical memory segment of the second memory.

6. The memory system of claim 1, wherein when the memory system reads data corresponding to the first virtual memory segment, the memory controller is configured to:
   perform a reading operation to the first memory and the second memory according to a corresponding address;
   combine first reading data received from the first memory through the first data port and second reading data received from the second memory through the second data port to generate output data; and
   output the output data.

7. The memory system of claim 6, wherein the memory controller determines the corresponding address to be corresponding to the first virtual memory segment or the second virtual memory segment according to a most significant bit of the corresponding address.

8. The memory system of claim 1, wherein when the memory system reads data corresponding to the second virtual memory segment, the memory controller is configured to:
   perform a reading operation to the second memory according to a corresponding address;
   take reading data received from the second memory through the second data port as output data; and
   output the output data.

9. The memory system of claim 1, wherein a data bandwidth of the first memory and a data bandwidth of the second memory are the same.

10. A method for operating a memory system, the memory system comprising a first memory and a second memory, a capacity of the second memory being greater than a capacity of the first memory, the second memory comprising a first physical memory segment and a second physical memory segment, the first physical memory segment of the second memory and the first memory being corresponding to a first virtual memory segment, the second physical memory segment of the second memory being corresponding to a second virtual memory segment, and the method comprising:
    performing a reading operation to the first memory and the second memory according to a corresponding address;
    the first memory outputting first reading data;
    the second memory outputting second reading data; and
    outputting output data according to whether the corresponding address is corresponding to the first virtual memory segment or the second virtual memory segment.

11. The method of claim 10, wherein outputting the output data according to whether the corresponding address is corresponding to the first virtual memory segment or the second virtual memory segment comprises:
    when the corresponding address is corresponding to the first virtual memory segment, combining the first reading data and the second reading data as the output data.

12. The method of claim 10, wherein outputting the output data according to whether the corresponding address is corresponding to the first virtual memory segment or the second virtual memory segment comprises:
    when the corresponding address is corresponding to the second virtual memory segment, taking the second reading data as the output data.

13. The method of claim 10, wherein the first memory and the second memory are synchronous dynamic random-access memories (SDRAM).

14. The method of claim 10, wherein:
    when the corresponding address is corresponding to the first virtual memory segment, the memory system outputs the output data with a first effective bandwidth;
    when the corresponding address is corresponding to the second virtual memory segment, the memory system outputs the output data with a second effective bandwidth; and
    the first effective bandwidth is greater than the second effective bandwidth.

15. The method of claim 10, wherein the first physical memory segment of the second memory has a same capacity as the first memory.

16. The method of claim 10, wherein the first physical memory segment of the second memory has a same capacity as the second physical memory segment of the second memory.

17. The method of claim 10, wherein a data bandwidth of the first memory and a data bandwidth of the second memory are the same.

18. The method of claim 10, further comprising:
 determining the corresponding address to be corresponding to the first virtual memory segment or the second virtual memory segment according to a most significant bit of the corresponding address.

\* \* \* \* \*